US008656771B2

(12) United States Patent
Hasegawa et al.

(10) Patent No.: US 8,656,771 B2
(45) Date of Patent: Feb. 25, 2014

(54) DEVICE FOR MEASURING THICKNESS OF CLOTH AND METHOD FOR MEASURING THICKNESS OF CLOTH

(75) Inventors: Kenji Hasegawa, Tokyo (JP); Tomoyuki Okada, Tokyo (JP); Nobuhisa Ito, Tokyo (JP)

(73) Assignee: YKK Corporation (JP)

( * ) Notice: Subject to any disclaimer, the term of this patent is extended or adjusted under 35 U.S.C. 154(b) by 233 days.

(21) Appl. No.: 13/266,835

(22) PCT Filed: Apr. 30, 2009

(86) PCT No.: PCT/JP2009/058520
§ 371 (c)(1),
(2), (4) Date: Feb. 1, 2012

(87) PCT Pub. No.: WO2010/125683
PCT Pub. Date: Nov. 4, 2010

(65) Prior Publication Data
US 2012/0131997 A1 May 31, 2012

(51) Int. Cl.
*G01L 5/04* (2006.01)
(52) U.S. Cl.
USPC .............. 73/159; 269/1; 269/2; 269/5; 269/6; 269/86; 269/134; 269/136; 269/216; 26/70
(58) Field of Classification Search
USPC ........... 73/159; 26/70; 269/1, 2, 5, 6, 86, 134, 269/136, 216
See application file for complete search history.

(56) References Cited

U.S. PATENT DOCUMENTS 4,416,104 A * 11/1983 Yamada ........................ 53/375.6
4,941,269 A * 7/1990 Mori et al. ....................... 33/783
7,093,373 B2 * 8/2006 Sugai et al. ...................... 33/792
7,458,576 B2 * 12/2008 Kawasaki et al. ......... 271/265.04
2006/0037389 A1 * 2/2006 Jorkama .......................... 73/159

FOREIGN PATENT DOCUMENTS

| JP | 38-24161 Y1 | 11/1963 |
| JP | 10-99300 A | 4/1998 |
| JP | 2989589 B1 | 10/1999 |
| JP | 3065835 U | 11/1999 |

OTHER PUBLICATIONS

International Search Report and Written Opinion, PCT International Patent Application No. PCT/JP2009/058620, mailed Jun. 30, 2009.

* cited by examiner

*Primary Examiner* — Kumar Patel
*Assistant Examiner* — Marrit Eyassu
(74) *Attorney, Agent, or Firm* — Kilpatrick, Townsend & Stockton LLP

(57) ABSTRACT

A device and method for measuring the thickness of a cloth when the predetermined pressing force is applied to the cloth. A device for measuring a cloth thickness includes a stationary part having a base surface; a movable member having a pressing end to press a cloth against the base surface; a movable member driving mechanism to move the movable member linearly without rotating around itself from an initial position up to an over-pressing position where the pressing end presses the cloth against the base surface with a force exceeding the predetermined pressing force; a load cell for detecting a force with which the pressing end presses the cloth against the base surface; and a pulse coder for detecting the space between the base surface and the pressing end when a force value detected by the load cell reaches the predetermined pressing force.

8 Claims, 2 Drawing Sheets

DEVICE FOR MEASURING THICKNESS OF CLOTH AND METHOD FOR MEASURING THICKNESS OF CLOTH

This application is a national stage application of PCT/JP2009/058520, which is incorporated herein by reference.

BACKGROUND OF THE INVENTION

This invention relates to a device for measuring a cloth thickness and a method for measuring a cloth thickness, and more specifically, relates to a device and a method for measuring the thickness of a cloth when the predetermined pressing force is applied to the cloth in order to previously ascertain the suitability of fixing a button, a grommet and the like to a variety of cloths.

Generally, a button, a grommet and the like (hereinafter simply referred to as a "button") are fixed to a cloth such as clothing by the following way. First, the button is held by an upper fixing die and a button-fixing member such as an eyelet and a prong is supported on a lower fixing die, with the cloth placed between the upper and lower dies. After that, by operating a pressing machine, the upper die is caused to press against the lower die with a force of about 200 to 300 N. As a result of the pressing, a part of the fixing member is swaged after piercing the cloth, so that the button is locked on the cloth by the swaged part. The cloth on which the button has been fixed is partially thinned as compressed by the above swaged part. Here, the degree of being thinned varies depending on cloth types and initial thicknesses or a fixing member as used, especially the size, material, etc. of a part of the fixing member which pierces a cloth. Accordingly, if a combination of a cloth, a button and a button-fixing member is unsuitable, defects may be caused as follows: That is, a cloth can be easily breakable when the cloth is excessively thinned with a button fixed thereon, or a button can easily come off a cloth when the thinning of the cloth is insufficient with a poor compression by a swaged part. In order to prevent such fixing defects, conventionally, a thickness of a cloth with a button fixed thereon is previously ascertained by applying the same force to the cloth as the above-mentioned pressing force and then measuring the thickness of the cloth at that time, which is almost identical to the thickness of the cloth to which a button has been fixed. In this way, a button and a fixing member which are considered suitable for the cloth are selected.

A prior-art device for measuring a cloth thickness is disclosed in Japanese Patent No. 2989589. The device for measuring a cloth thickness is constructed as follows: The device includes a stationary part at one end of an arc-shaped frame and a movable member at the other end of the frame. After a cloth as a measurement target is placed between the stationary part and the movable member, the cloth is gradually compressed by moving the movable member toward the stationary part while rotating the movable member by operating a dial operational part. While the force or pressure being applied to the cloth is being detected from a distortion of the arc-shaped frame, the movable member is stopped when the force reaches the predetermined value (for example, 200 N). The cloth thickness at the time of stopping the movable member can be ascertained from the amount of displacement of the movable member.

However, for the prior-art device for measuring a cloth thickness, it is necessary to continue to rotate the operational part until the force applied to a cloth reaches the predetermined value, so it takes time and effort in measuring. In addition, since the movable member is pressed to the cloth while being rotated, non-negligible measurement errors may occur depending on a cloth type due to rotational friction.
[Patent document 1] Japanese Patent No. 2989589

SUMMARY OF THE INVENTION

In view of the above problems in the prior-art device, an object of the invention is to provide a device for measuring a cloth thickness and a method for measuring a cloth thickness which are capable of measuring the thickness of a cloth at the moment when the predetermined pressing force is applied more simply, rapidly and accurately.

To solve the above problems, according to an invention, there is provided a device for measuring a cloth thickness to measure the thickness of a cloth at the moment when the cloth is pressed with the predetermined pressing force, comprising: a stationary part having a base surface; a movable member having a pressing end to press a cloth against the base surface; a movable member driving mechanism to move the movable member linearly without rotating around itself from an initial position where the pressing end does not contact the cloth up to an over-pressing position where the pressing end presses the cloth against the base surface with a force exceeding the predetermined pressing force; a means for detecting a force with which the pressing end presses the cloth against the base surface; and a means for detecting the space between the base surface and the pressing end at the moment when a force value detected by the force-detecting means reaches the predetermined pressing force while the movable member is being moved from the initial position to the over-pressing position.

In the invention, the movable member is moved from the initial position up to an over-pressing position where a pressing force applied to a cloth exceeds the predetermined value (for example, about 200 to 300 N) and, on the way to an over-pressing position, the space between the base surface and the pressing end at the moment when a pressing force applied to the cloth reaches the predetermined value is detected as the thickness of the cloth. A pressing force applied to the cloth at an over-pressing position can be a value which exceeds the predetermined value by at least a slight difference. Therefore, an over-pressing position is a non-fixed position, not a fixed position. An over-pressing position is actually the position where the movable member is stopped by the base surface. Therefore, the movable member driving mechanism is constructed in such a way that the pressing force applied to the cloth by the movable member at the position where the movable member is stopped exceeds the predetermined pressing force by at least a slight difference. It is possible to easily move the movable member to a non-fixed over-pressing position in a moment of time compared to moving the movable member to a fixed specific position exactly. In the invention, the movable member can be moved from the initial position to an over-pressing position linearly without rotating around itself at a stroke or rapidly. Further, rotational friction is not caused in the cloth.

As a means for detecting a force, pressure sensor such as a lord cell can be used. A pressure sensor may be provided at the base surface of the stationary part or at the pressing end of the movable member.

As a means for detecting the space, a displacement sensor such as a pulse coder and a position sensor can be used. In the invention, it is possible to detect an amount of displacement of the movable member from the initial position using a displacement sensor and to determine the space between the base surface and the pressing end, namely, the thickness of the cloth based on the displacement amount.

In the invention, a control unit can be used to detect the space between the base surface and the pressing end at the moment when the value detected by the force detecting means reaches the predetermined pressing force while the movable member is moving from the initial position to an over-pressing position, the control unit including CPU, ROM, RAM, input/output interfaces and the like. In this case, it is possible to construct as follows, for example. The predetermined pressing force value is previously stored in ROM, and pressing force values and space values are being sent to RAM in real time from the force detecting means and the space detecting means via an input interface. At this time, CPU is comparing the detected pressing force values with the predetermined pressing force value, and then outputs the detected space value at the moment when the detected pressing force value matches with (or goes just beyond) the predetermined pressing force via an output interface.

In the invention, the device can further include a display; and a control unit as mentioned above causes the display to display the value detected by the space-detecting means at the moment when a force value detected by the force-detecting means reaches the predetermined pressing force. As a display, a LCD, a plasma display, a CRT, etc. can be used.

In an embodiment of the invention, the movable member driving mechanism includes an operational lever, a stationary pivot which rotatably supports the operational lever, and a link mechanism which transmits a turning motion of the operational lever caused by a measurer grasping the operational lever to the movable member to move the movable member from the initial position to the over-pressing position. In this case, the movable member can be moved from the initial position to an over-pressing position simply by a measurer grasping the operational lever. In addition, the movable member driving mechanism can include a bearing provided for the stationary pivot, the bearing supporting a side of the movable member. The movable member might become distorted by repeatedly striking the base surface with the pressing end in use, which may cause errors in detecting the displacement of the movable member. The bearing can help prevent such a distortion by supporting a side of the member.

According to another invention, there is provided a method for measuring a cloth thickness to measure the thickness of a cloth at the moment when the cloth is pressed with the predetermined pressing force, comprising steps of: placing a cloth between a base surface of a stationary part and a pressing end of a movable member; moving the movable member linearly without rotating around itself from an initial position where the pressing end does not contact the cloth up to an over-pressing position where the pressing end presses the cloth against the base surface with a force exceeding the predetermined pressing force; detecting a force with which the pressing end presses the cloth against the base surface; and detecting the space between the base surface and the pressing end at the moment when the detected pressing force value reaches the predetermined pressing force while the movable member is being moved from the initial position to the over-pressing position. The space-detecting step can include detecting the amount of displacement of the movable member from the initial position until the position where the detected pressing force value reaches the predetermined pressing force.

In the inventions, it is possible to ascertain the thickness of a cloth as the space between the base surface and the pressing end at a moment while the movable member is being rapidly moved linearly without rotating around itself from the initial position to an over-pressing position where a pressing force applied to the cloth exceeds the predetermined value. Accordingly, it is possible to perform a measurement operation simply, rapidly, and further accurately due to no rotational friction in a cloth.

DETAILED DESCRIPTION OF THE INVENTION

Figure 1:
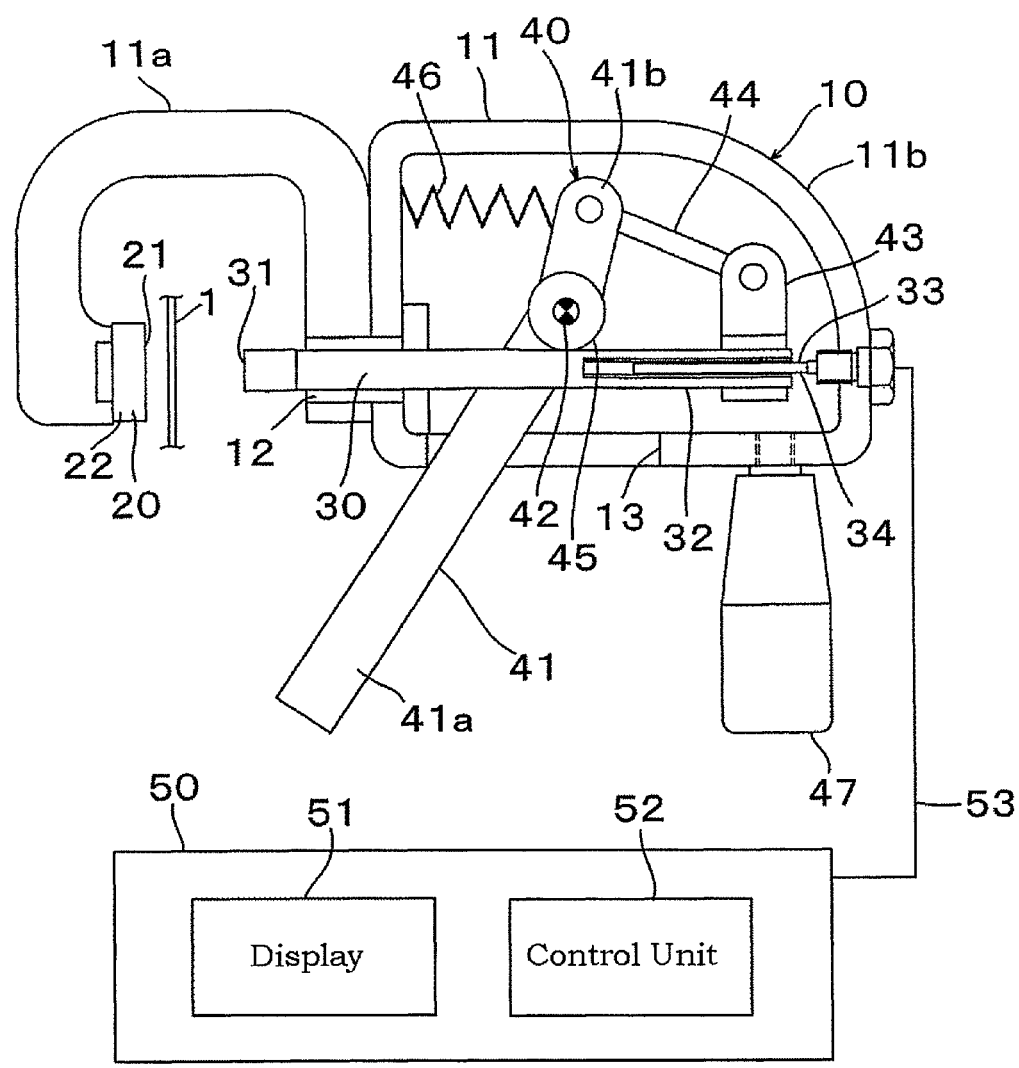
FIG. 1 is a structural view of a device for measuring a cloth thickness according to an embodiment of the invention.

Hereinafter, preferred embodiments of the invention will be described with referring to the drawings. FIG. 1 is a structural view of a device for measuring cloth thickness according to an embodiment of the invention. The device comprises a lever handle type measuring instrument 10 capable of being operated with one hand of an operator and a control box 50 which processes a detection signal input from the measuring instrument 10 as described later to cause a display 51 to display a thickness of a cloth. The control box 50 includes a control unit 52 and a power unit, etc. The control unit 52 includes, although not illustrated, CPU, ROM, RAM, input-output interfaces including A/D and D/A converters, amplifiers, etc.

The measuring instrument 10 comprises a stationary part 20 having a circular base surface 21 facing rearward (rightward in FIG. 1; hereinafter, "rear" denotes the right side and "front" denotes the left side in FIG. 1.); a bar-like movable member 30 capable of linearly moving forward and rearward along the axis of the base surface 21 without rotating around itself, the movable member 30 having a pressing end 31 at a front end thereof to press a cloth 1 forward from the rear against the base surface 21 of the stationary part 20; a movable member driving mechanism 40 to move the movable member 30 at once or rapidly from a later-described initial position to an over-pressing position by a measurer grasping, or pulling rearward an operational lever 41; a load cell 22 built in the base surface 21 part as a pressure detecting means to detect a pressing force being applied to the cloth 1 by the pressing end 31 against the base surface 21; a pulse coder 34 as a movable member displacement detecting means to detect an amount of displacement of the movable member 30 from the initial position, the pulse coder 34 being built in a support shaft 33 which supports a rearward portion 32 of the movable member 30, the rearward portion 32 being formed in a hollow cylindrical form; and a frame body 11 which supports the aforementioned structural members integrally. The frame body 11 consists of an inverted U-shaped front frame 11a and a box-shaped rear frame 11b (In FIGS. 1 and 2, the both side walls of the rear frame 11b are illustrated as opened). The stationary part 20 is arranged at a front one end of the front frame 11a. The other end of the front frame 11a and a front wall of the rear frame 11b support a frontward portion of the movable member 30 via a bearing 12 allowing the member 30 to move forward and rearward. The box-like rear frame 11b contains the movable member driving mechanism 40 except for a part (a movable grip part 41a) of the operational lever 41, the movable member 30 except for the frontward portion including the pressing end 31, and the pulse coder 34. The load cell 22 and the pulse coder 34 are connected to the control unit 52 of the control box 50 via a signal line 53. The support shaft 33 in which the pulse coder 34 is built is supported at the rear end the shaft 33 by a rear wall of the rear frame 11b, and extends forward coaxially with the base surface 21 of the stationary part 20. Further, the support shaft 33 is a spline shaft which has a plurality of projections (not illustrated) formed in the circumferential direction, each of the projections extending axially. On the other hand, in the inner circumference of the hollow, cylindrical rearward portion 32 of the movable member 30, the same number of grooves (not illustrated) as the projection are formed, which extend axially and can engage with the projections of the support shaft 33. Owing to the engagement between the projections of the support shaft 33 and the grooves of the movable member 30, the movable member 30 becomes unable to rotate around itself, and can be guided forward and rearward along its axis.

Figure 2:
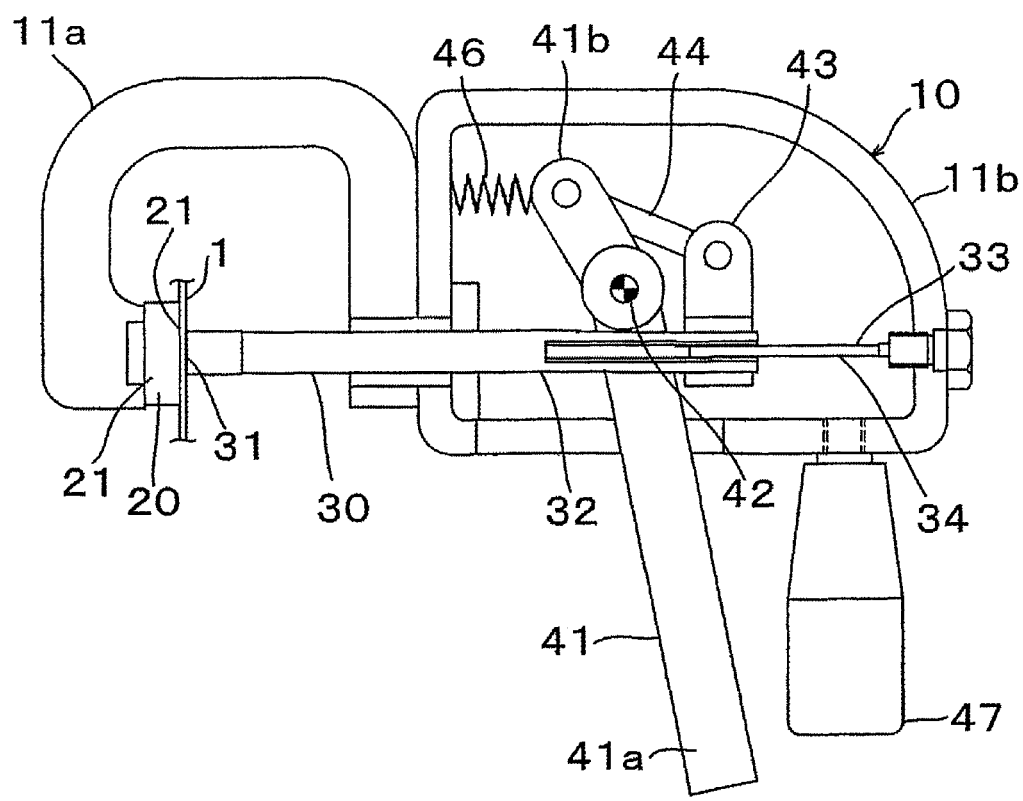
FIG. 2 is an explanatory side view of a measuring instrument showing a state that a movable member has been moved forward by pulling an operational lever.

The movable member driving mechanism 40 comprises the operational lever 41 including the movable grip part 41a projecting downward from an opening 13 in a bottom wall of the rear frame 11b, a stationary pivot 42 which rotatably supports the operational lever 41, a back-and-forth move part 43 fixed to the rear end of the movable member 30, and a linkage 44 provided between a lever opposite part 41b opposite to the movable grip part 41a of the operational lever 41 and the back-and-forth move part 43 to transfer the motion of the lever opposite part 41b to the move part 43. The lever opposite part 41b, back-and-forth move part 43 and the linkage 44 constitute a link mechanism for transmitting the turn of the operational lever 41 to the movable member 30. The movable member driving mechanism 40 further includes a bearing 45 provided for the stationary pivot 42 and a spring 46 between the lever opposite part 41b and the front wall of the rear frame 11b. The bearing 45 can serve to prevent the movable member 30 from being deformed by supporting the upper side of the member 30 from above during the back-and-forth motion of the member 30. The movable member 30 might be distorted by repeatedly striking the base surface 21 with the pressing end 31 in use, which may cause errors in detecting the displacement of the movable member 30. A function of the spring 46 will be described later. The reference numeral 47 represents a stationary grip part, which is fixed to the bottom wall of the rear frame 11b. When operating the operational lever 41, a measurer grasps the movable grip part 41a of the operational lever 41 as putting his/her thumb on the stationary grip part 47. FIG. 2 shows a state that the movable member 30 has been moved forward by a measurer pulling the operational lever 41 from the state of FIG. 1. When the measurer pulls the movable grip part 41a of the lever 41 rearward from the state of FIG. 1, the lever 41 pivots on or turns around the stationary pivot 42, the lever opposite part 41b is displaced in the counterclockwise direction against the bias of the spring 46. The displacement of the lever opposite part 41b pulls the back-and-forth move part 43 forward via the link portion 44, which causes the movable member 30 to move forward (see FIG. 2). When the measurer or operator releases the operational lever 41 from the state, the spring 46 pushes the lever opposite part 41b rearward, namely, in the clockwise direction at the center of the stationary pivot 42, which returns the movable member 30 and the movable member driving mechanism 40 to the position of FIG. 1 through the motion reverse to the above motion. Therefore, the operation to return the movable member 30 to the initial position is remarkably facilitated in the device for measuring cloth thickness according to the embodiment compared to a prior-art device which needs to rotate a dial to move a movable member rearward.

Next, a way to use the device for measuring cloth thickness structured as described above will be explained with an example of measuring the thickness of the cloth 1 when a force of e.g. 200 N is applied to the cloth 1. The force value of 200 N has been previously stored in ROM of the control unit 52 as fixed data. Further, before starting a measurement, the position of the movable member 30 prior to pulling the operational lever 41 of the measuring instrument 10 is defined as the initial position at which the amount of displacement of the member 30 as detected by the pulse coder 34 is zero. In the second time or later of measuring, it will be ensured that the amount of displacement of the member 30 is zero at the initial position. A measurer first places by hand the cloth (a cloth piece) 1 to be measured between the base surface 21 of the stationary part 20 and the pressing end 31 of the movable member 30 lying at the initial position, at a position closing to the base surface 21. After that, the measurer pulls the measurement lever 41, and then simply releases it after the movable member 30 which is moved by pulling the lever is stopped by the stationary part 20. If the measuring instrument 10 is vertically used with the base surface 21 being horizontal and facing upward, the cloth 1 is simply placed on the base surface 21.

When the measurer pulls the measurement lever 41, the movable member 30 is moved forward from the initial position by the movable member driving mechanism 40, and then stopped by the base surface 21' of the stationary part 20 after the pressing end 31 has compressed the cloth 1 against the base surface 21. This movement of the movable member 30 is completed in one to two seconds or so. The movable member driving mechanism 40 is constructed in such a way that, at the position where the movable member 30 is finally stopped, the force applied to the cloth 1 by the pressing end 31 somewhat exceeds 200 N as the measurement reference value. In this embodiment, the movable member driving mechanism 40 is designed so that the pressing end 31 of the movable member 30 presses the cloth 1 with a force up to about 245 N (about 25 kilogram-weight) when a measurer pulls the measurement lever 41 (the force of pulling the lever is only about 49 N or about 5 kilogram-weight), for example. Therefore, at the time of the movable member 30 being stopped past the position corresponding to the reference pressing value of 200 N, the force applied to the cloth 1 by the pressing end 31 exceeds the 200 N reference value by at least a slight difference. The position where the movable member 30 has been finally stopped will be hereinafter referred to as "an over-pressing position." While the movable member 30 is being moved from the initial position to an over-pressing position, the pulse coder 34 detects in real time an amount of the displacement of the movable member 30 from the initial position. The detected displacement values are transmitted to the input interface of the control unit 52 through the signal line 53 as analog signals, and then continuously stored in RAM after being amplified and analog to digital converted in the input interface. Concurrently, the load cell 22 detects in real time the force applied to the base surface 21, namely, the force with which the pressing end 31 is pressing the cloth 1 from the moment at which the pressing end 31 of the movable member 30 come into contact with the cloth 1 until at the time of reaching an over-pressing position. The detected pressing values are also continuously stored in RAM via the input interface of the control unit 52 through the signal line 53. Then, CPU compares in real time the detected pressing values in RAM with the pressing reference value as previously stored in ROM and, at the moment when both of the values become equal to each other (or at the moment when the detected value first exceeds the reference value), causes the display 51 to display the thickness of the cloth 1 translated from the measured displacement amount value in that instant via the output interface.

As described above, to perform a measurement, a measurer is simply needed to pull the operational lever 41, and by the pulling, the movable member 30 is moved linearly from the initial position to an over-pressing position where the movable member 30 is stopped by the stationary part 20 at a stroke. Accordingly, a measurement operation can be performed simply and rapidly. Further, a measurement operation can be done accurately because the movable member 30 moves without its rotation and rotational friction is not generated in the cloth 1 during measurement.

Description of Reference Numbers

1 cloth
10 measuring instrument
20 stationary part
21 base surface
22 load cell
30 movable portion
31 pressing end
34 pulse coder (Space detecting means/Displacement detecting means)
40 movable member driving mechanism
41 operational lever
41*b* lever opposite part
42 stationary pivot
43 back-and forth move part
44 linkage
46 spring
50 control box
51 display
52 control unit

The invention claimed is:

1. A device for measuring a cloth thickness to measure the thickness of a cloth at the moment when the cloth is pressed with the predetermined pressing force, comprising:
    a stationary part having a base surface;
    a movable member having a pressing end to press a cloth against the base surface;
    a movable member driving mechanism to move the movable member linearly without rotating around itself from an initial position where the pressing end does not contact the cloth up to an over-pressing position where the pressing end presses the cloth against the base surface with a force exceeding the predetermined pressing force;
    a means for detecting a force with which the pressing end presses the cloth against the base surface; and
    a means for detecting the space between the base surface and the pressing end at the moment when a force value detected by the force-detecting means reaches the predetermined pressing force while the movable member is being moved from the initial position to the over-pressing position.

2. The device for measuring a cloth thickness according to claim 1 further including:
    a display; and
    a control unit causes the display to display the value detected by the space-detecting means at the moment when a force value detected by the force-detecting means reaches the predetermined pressing force.

3. The device for measuring a cloth thickness according to claim 1,
    wherein the space-detecting means includes a means for detecting an amount of displacement of the movable member from the initial position, and detects the space between the base surface and the pressing end based on an amount of displacement of the movable member.

4. The device for measuring a cloth thickness according to claim 1,
    wherein the force-detecting means is built in the base surface.

5. The device for measuring a cloth thickness according to claim 1,
    wherein the movable member driving mechanism includes an operational lever, a stationary pivot which rotatably supports the operational lever, and a link mechanism which transmits a turning motion of the operational lever caused by a measurer grasping the operational lever to the movable member to move the movable member from the initial position to the over-pressing position.

6. The device for measuring a cloth thickness according to claim 5,
    wherein the movable member driving mechanism includes a bearing provided for the stationary pivot, and wherein the bearing supports a side of the movable member.

7. A method for measuring a cloth thickness to measure the thickness of a cloth at the moment when the cloth is pressed with the predetermined pressing force, comprising steps of:
    placing a cloth between a base surface of a stationary part and a pressing end of a movable member;
    moving the movable member linearly without rotating around itself from an initial position where the pressing end does not contact the cloth up to an over-pressing position where the pressing end presses the cloth against the base surface with a force exceeding the predetermined pressing force;
    detecting a force with which the pressing end presses the cloth against the base surface; and
    detecting the space between the base surface and the pressing end at the moment when the detected pressing force value reaches the predetermined pressing force while the movable member is being moved from the initial position to the over-pressing position.

8. The method for measuring a cloth thickness according to claim 7,
    wherein the space-detecting step includes detecting the amount of displacement of the movable member from the initial position until the position where the detected pressing force value reaches the predetermined pressing force.

* * * * *